United States Patent [19]

Sakamoto

[11] 4,369,210

[45] Jan. 18, 1983

[54] LONG LIFE HEAT CONDUCTIVE BODY FOR UTILIZATION OF SOLAR HEAT ENERGY AND WATER HEATER FOR MAKING USE OF SAME

[76] Inventor: Yuichi Sakamoto, No. 8-21, Shingashi 2-chome, Itabashi-ku, Tokyo, 175, Japan

[21] Appl. No.: 69,532

[22] Filed: Aug. 24, 1979

[51] Int. Cl.³ ............................................... B05B 5/00
[52] U.S. Cl. .................................... 427/160; 126/445; 126/449; 126/450
[58] Field of Search ............... 126/449, 417, 450, 442, 126/444, 445, 440, 901; 260/42.17, 42.18; 165/DIG. 8, 180; 23/313 AS, 304, 305 F; 427/421, 160

[56] References Cited

U.S. PATENT DOCUMENTS

| | | | |
|---|---|---|---|
| 3,968,786 | 7/1976 | Spielberg | 126/442 |
| 4,009,043 | 2/1977 | Pres | 260/42.17 X |
| 4,039,492 | 8/1977 | Hamilton | 260/42.17 X |
| 4,170,983 | 10/1979 | Sadler | 126/450 |
| 4,222,373 | 9/1980 | Davis | 126/450 X |

Primary Examiner—Larry Jones
Attorney, Agent, or Firm—Jordan B. Bierman; Linda Bierman

[57] ABSTRACT

A heat conductive body for use in apparatus for the heating of liquid by way of solar radiation incident on the conductive body is formed of a mixture of sand iron with a fiber-reinforced formable plastic material. A heater apparatus uses the inventive conductive body for maintaining a supply of heated water.

3 Claims, 4 Drawing Figures

LONG LIFE HEAT CONDUCTIVE BODY FOR UTILIZATION OF SOLAR HEAT ENERGY AND WATER HEATER FOR MAKING USE OF SAME

BACKGROUND OF THE INVENTION

The present invention relates to a heat conductive body for use in the heating of liquid by way of solar radiation incident on the conductive body, as well as to a water heater incorporating such a heat conductive body.

The present energy crisis has quickly become a world-wide problem of the most critical importance. It has been widely recognized that the use of petroleum as a major energy source must hereinafter decrease in the face of declining oil reserves. The development of alternative energy sources, such as nuclear power and the harnessing of natural phenonmenon for the production of energy, is accordingly becoming a matter of increasing urgency.

The present invention is directed to the provision of a heat conductive body which utilizes solar energy or radiation incident on the body to heat a liquid. The invention also contemplates use of the conductive body in a water heater of novel design.

Conventional heat conductive bodies comprise metallic plates having good thermal conductivity. Typically, the metal plate is heated by incident solar radiation and transmits its increased temperature to water flowing in contact therewith. The metal plate may, for example, be formed as a tube whereby the water flows through its interior. Various additional measures, such as the application of a thermally-conductive material to the exterior surface of the metal plate, are sometimes used to increase the absorption efficiency of the plate with respect to incident solar radiation.

It is well known that heat conductive bodies of metal plate suffer from a wide range of problems. The metal plate generally exhibits comparatively rapid oxidation and aging on its exterior faces due to the presence of impurities and moisture in the air. Corrosion is particularly problematical at weld points and develops all the more quickly as a result of the elevated temperature of the fast-moving liquid which is in virtually constant contact with the metal. The corrosion is thereby able to accumulate day-to-day, adversely affecting the heat conductivity of the metal plate and significantly decreasing its effective lifetime. It is also understood that the additional layer of heat absorption material applied to the surface of the metal plate is prone to peeling from the plate, thereby exposing such surface to rapid oxidation and consequent aging. Thus, the metal plate deteriorates from both of its opposite faces, being simultaneously oxidized by the air and corroded by the fast-moving contact liquid.

SUMMARY OF THE INVENTION

It is, therefore, an object of the invention to provide a heat conductive body capable of substantially slowing the deterioration of the material and thereby significantly increasing its lifetime of usefulness in conjunction with the contact heating of a liquid. At the same time, the heat conductive body should provide a heat conductivity and transmission efficiency equivalent to that of conventional, metal plates bodies.

It is also an object of the invention to provide a water heater which utilizes the inventive heat conductive body.

In accordance with the invention, there is provided a long life heat conductive body obtained by mixing sand iron with a formable material such as plastic—and more particularly fiber-reinforced plastic—and then forming the mixture into a desired configuration or shape. Thus, a durable plastic is used as a base material, in lieu of conventionally-utilized metal plate, for forming a plate or a pipe or whatever structural arrangement is required. Prior to shaping the base material, the sand iron is mixed and blended with the plastic, the mixture then being formed into the desired configuration. Thus, the actual molding or formation of the material into a desired shape can be performed in the same manner as conventionally done with pure plastic material.

It has been experimentally determined that sand iron having a titanium content of at least 3% by weight exhibits superior heat conductivity and is therefore eminently suitable for use in forming the heat conductive body of the present invention. It has also been found that the desired properties of the inventive heat conductive body can be achieved by mixing the sand iron with the plastic material at a weight ratio of approximately 1 part sand iron to 2 parts plastic.

As previously stated, the mixture of sand iron and plastic is advantageously formed to the configuration or shape desired for the particular application. Shapes such as flat or curved plates, pipes, and others are easily attainable utilizing conventional forming technics. The structural rigidity of the selectively configured body is provided by the plastic base or matrix material, insuring a semi-permanent life of the body. In addition, the mixture of sand iron with the plastic assures a heat conductivity of the body substantially equivalent to that of conventionally-utilized metal plate.

Thus, according to one aspect of the invention, a heat conductive body is produced by mixing or blending sand iron with the plastic material and then forming the mixture into a predetermined configuration or shape. Preferably, the sand iron is uniformly distributed throughout the plastic matrix or base material so that heat conductivity is substantially uniform throughout the entire heat conducting body.

According to another aspect of the invention, a heat conductive body is obtained by uniformly coating at least one surface of a plastic plate or body with a layer of the aforedescribed mixture of sand iron and plastic. This may be accomplished by spraying a surface of a comparatively thin plastic base plate or substrate with a solution consisting of sand iron mixed with a plastic material of the same kind as that comprising the plastic substrate. The sprayed layer unitarily bonds to the plastic substrate to form a single, integral body. The spraying operation may be repeated until a desired thickness of the sprayed material on the plastic substrate is attained. Those skilled in the art will recognize that the plastic base or substrate, having a heat conductivity inferior to that of conventionally-used metal plate, is preferably relatively thin so as not to adversely affect the efficiency of heat conductivity through the unitary and integral conductive body.

Additional objects, features, and advantages of the present invention will be more fully realized by reference to the following detailed description of presently preferred, but nonetheless illustrative, embodiments in accordance with the invention, wherein.

DETAILED DESCRIPTION OF THE PREFERRED EMBODIMENTS

Figure 1:
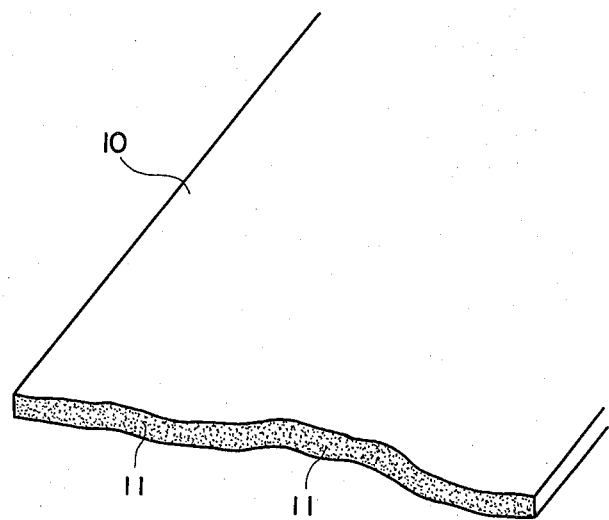
FIG. 1 is an elevated perspective view, partly in section, of a heat conductive plate constructed in accordance with a first embodiment of the invention.

Referring now to FIG. 1, the reference numeral 10 designates a heat conductive body or plate constructed in accordance with the teachings of the present invention. The plate 10 is formed by mixing sand iron (also known as iron sand or titanomagnetite 11 with a matrix of a fiber-reinforced plastic material at a preferred weight ratio of 1 part sand iron to 2 parts plastic. Preferably, the sand iron includes a titanium content of at least 3% by weight to provide the minimum desired degree of heat conductivity, although it is not intended that the composition of the sand iron be so limited. The plastic material and the sand iron are blended together to uniformly disperse the sand iron throughout the plastic matrix. The blended mixture may then be formed into the desired shape. For purposes of illustration, FIG. 1 shows the mixture formed as a substantially flat plate.

The use of a plastic material—and preferably, but not necessarily, one that is fiber-reinforced—notably increases the durability and lifetime of the conductive body 10 when compared to conventionally-utilized metal plate. The plastic is not prone to oxidation on contact with the atmosphere; nor does it corrode or otherwise wear away either at its juncture or connection points or along its liquid-contact surfaces. Moreover, the use of sand iron distributed in and throughout the plastic material causes the conductive body 10 to exhibit heat conductivity substantially equivalent to that of metal plates and far superior to that exhibited by aluminum plates. Accordingly, superior durability and notably increased lifetime of a heat conductive body is attained in the present invention without sacrificing desired efficiency in the accumulation of heat energy from incident solar radiation and the conduction of the accumulated heat energy to a contact liquid such as water.

Figure 2:
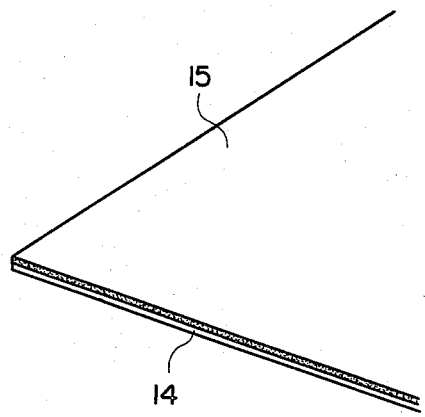
FIG. 2 is an elevated perspective view, partly in section, of a heat conductive plate constructed in accordance with another embodiment of the invention.

A second embodiment of a heat conductive body according to the present invention is seen in FIG. 2. In this second embodiment, a substrate 14 comprises a matrix of fiber-reinforced plastic. The thickness of the substrate 14 is preferably as small as possible since the heat conductivity of plastic is less than that of conventionally-used metal plate.

A heat conductive layer 15 is subsequently provided on the upper surface of the substrate 14. (The layer 15 may also be provided on the opposite face of the substrate if so desired.) The conductive layer 15 is formed by preparing a solution comprising the mixture of sand iron and fiber-reinforced plastic discussed in connection with the embodiment of FIG. 1 and applying the solution to the substrate. Preferably, the plastic comprising the substrate 14 and that utilized in the solution 15 are the same so as to facilitate bonding of the two layers to each other.

More particularly, the mixture solution may be applied by spraying the same onto the surface of the substrate 14 which may initially be configured in the desired shape for the conductive body. The spraying operation may thereafter be repeated until the desired thickness of the heat conductive layer 15 on the substrate 14 is attained. Thus, the conductive layer 15 is built up, coat-by-coat, to its desired thickness on the substrate 14. The solution unitarily bonds to the underlying substrate as though the two portions were together integrally formed as a single body, thereby obviating any possibility of subsequent peeling or separation of the conductive layer 15 from the plastic substrate 14.

In the embodiment shown in FIG. 2, the sun's rays incident on the conductive layer 15 impart heat energy to this layer and the accumulated heat energy is transmitted through the substrate 14 to the water or other liquid to be heated. The relative thinness of the substrate 14 insures that the desired efficiency of heat transfer and conductivity is attained. At the same time, the use of a fiber-reinforced plastic material in both the substrate 14 and the heat conductive layer 15 and the unitary, mutual adhesion of each to the other provides significant structural durability and strength to enable the heat conductive body to retain its selective configuration or shape in spite of the relative thinness of the substrate 14.

Figure 3:
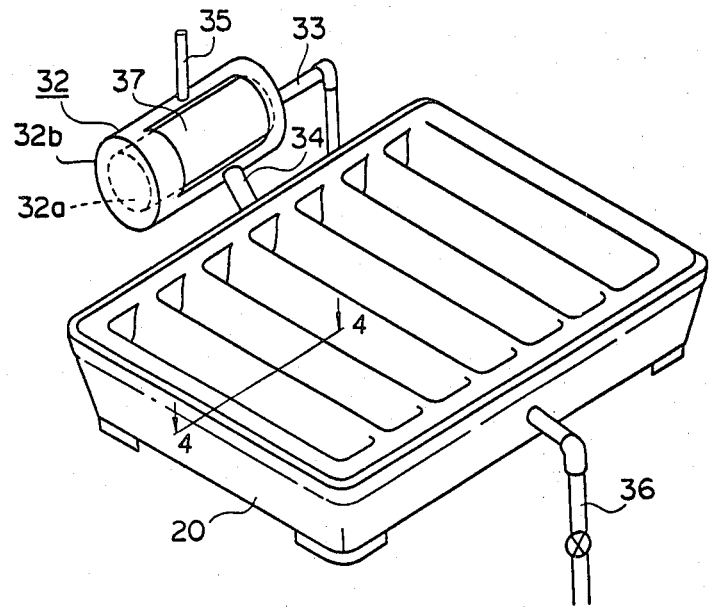
FIG. 3 is an elevated perspective view of a water heater employing the heat conductive plate of the present invention and utilizing radiant solar heat energy.
Figure 4:
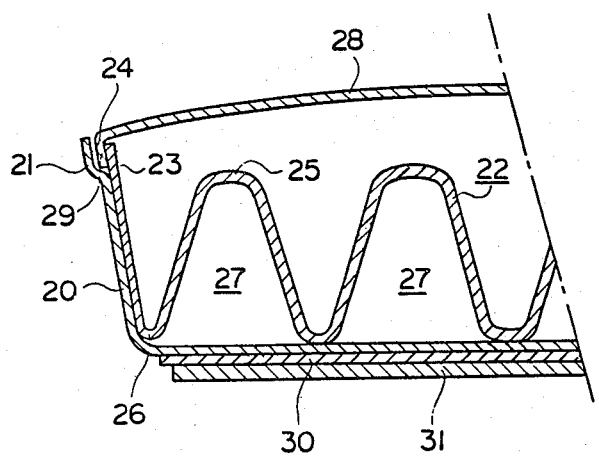
FIG. 4 is an enlarged sectional view taken along the lines A—A of FIG. 3.

FIG. 3 illustrates an example of a recirculation-type water heater constructed with the heat conductive body of the invention and utilizing radiant solar heat for imparting an elevated temperature to the water. A housing 20 delimits the exterior of the water heater and may be formed of a fiber-reinforced plastic material. As best seen in FIG. 4, a groove 24 is defined between a peripheral step portion 21 of the housing 20 and the peripheral edge 23 of a heat conductive plate 22 formed in accordance with the invention. The conductive plate 22 is provided with a corrugated cross-sectional configuration, the bottom ridges 26 of which contact the floor of the housing 20 to define a plurality of parallel channels or liquid conduction paths 27. The channels 27 mutually communicate with each other at their opposite ends.

A housing top or lid 28 is formed of a translucent or transparent material, such as a fiber reinforced plastic or glass, and includes a peripheral edge which is bent for mating engagement within the groove 24 to thereby form a relatively tight closure of the housing 20. Bottom plates 30, 31 may be provided on the housing 20 for further reinforcing its structural integrity.

A liquid storage tank 32 is disposed for communication with the channels 27 of the water heater. The system arrangement is such that the temperature differential of water heated in the channels 27 generates a convective flow of heated water into the storage tank 32. A pipe 33 supplies water to the storage tank 32 while a pipe 34 connects the tank 32 with the channels 27. A purge pipe 35 for eliminating air communicates with the interior of the storage tank 32, and a cistern (not shown) is provided on the supply pipe 33 to prevent overflowing of the tank 32. The heated hot water is discharged from the water heater through a discharge pipe 36.

The hot water storage tank 32 is shown as a double-walled container having an inner tank 32a interiorly spaced from an outer tank 32b, the space between the two tanks being filled with foamed urethane insulation or the like so as to effectively prevent radiated heat loss from the inner tank. A transparent window 37 is provided over one-third to one-half of the periphery of the outer tank 32b. The urethane insulation is omitted from the inner-tank space adjacent the window 37 so as to permit the impingement of radiant solar energy on the inner tank 32a through the window 37 and thereby provide auxiliary heating of the hot water contained in the storage tank 32.

The water heater so constructed is notably durable and has an extended lifetime as a result of its construction utilizing a heat conductive plate 22 and a housing 20, both of which are at least partially formed of a fiber-reinforced plastic material. In addition, a heating efficiency substantially equivalent to that provided by a conventional, metal plate water heater is attained as a result of the mixture of sand iron with fiber-reinforced plastic in forming the heat conductive body; the use of sand iron substantially enhances the heat conductivity of the body. Moreover, the use of fiber-reinforced plastic as the matrix material providing structural strength and integrity substantially eliminates the corrosion which is inevitable in conventional water heater designs. As a consequence, the water heater of the present invention has a lifetime significantly greater than that of conventionally-built units and its operative efficiency is accordingly maintained for an increased time period before replacement or repair is necessary.

A latitude of additional modification, change and substitution is intended in the foregoing disclosure. In some instances, some features of the invention will be employed without a corresponding use of other features. It is therefore appropriate that the appended claims be construed broadly and in a manner consistent with the spirit and scope of the invention herein.

What is claimed is:

1. A method of producing a heat conductive body for use in heating apparatus responsive to solar radiation incident on the body, said method comprising the steps of:

combining sand iron with plastic material in a flowable state, said sand iron being effective to provide substantially increased heat conductivity and transmission through the plastic material, mixing the combined sand iron and plastic material to provide a uniform blend throughout the mixture, and selectively forming the uniformly blended mixture to a desired configuration by depositing a layer of the uniformly blended mixture on at least a surface of a preformed plastic base.

2. A method according to claim 1, said predeterminately configured plastic base material being formed of the same material as the plastic material of said uniformly blended mixture.

3. A method according to claim 1, said depositing step comprising spraying the uniformly blended mixture on at least a surface of the plastic base material.

* * * * *